July 20, 1926.
A. AMES, JR
1,593,053
APPARATUS FOR PHOTOGRAPHY OF COMPOSITE IMAGES
Filed July 11, 1921
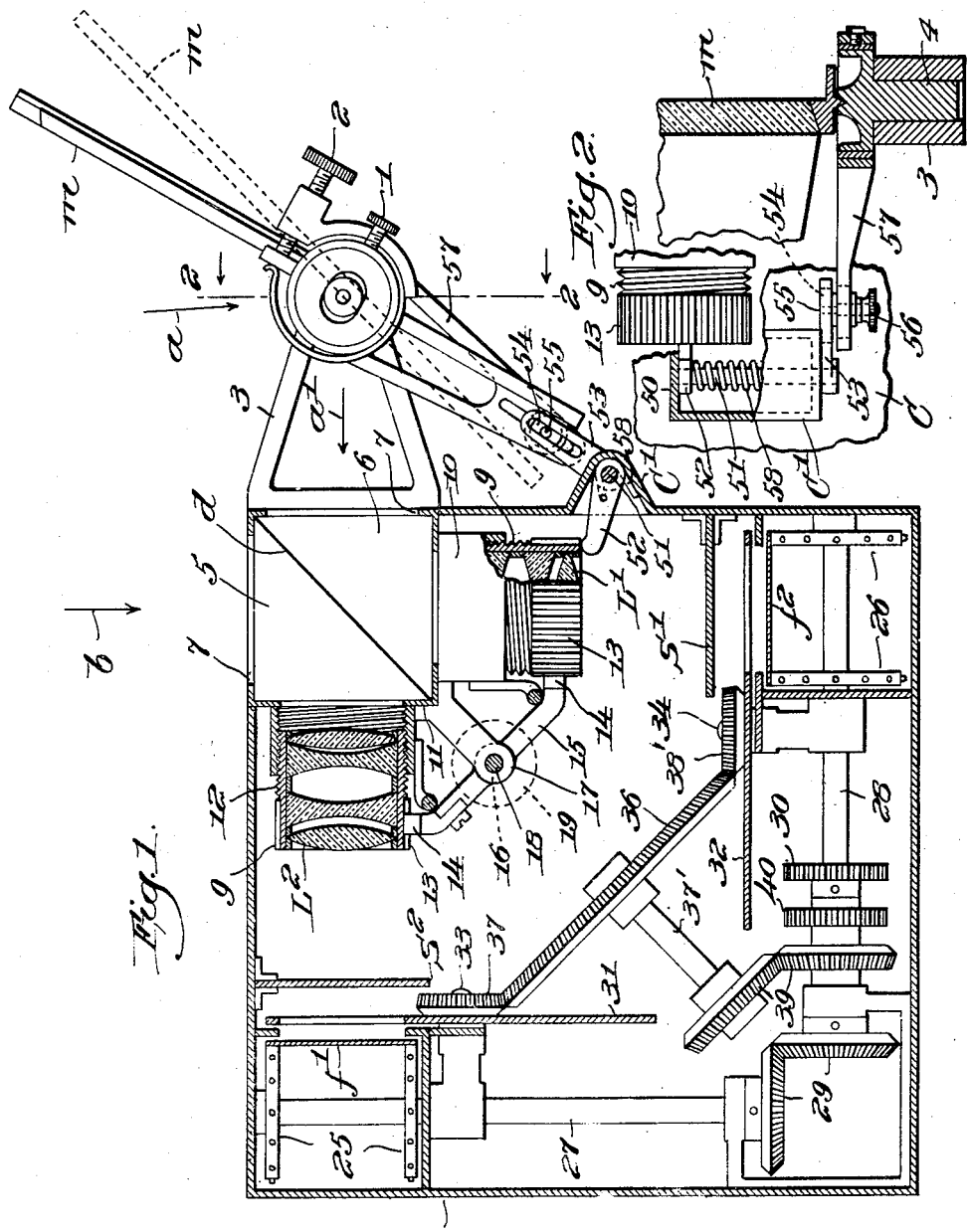
Inventor:
Adelbert Ames Jr.
by Roberts Roberts Cushman
his Attys.

Patented July 20, 1926.

1,593,053

UNITED STATES PATENT OFFICE.

ADELBERT AMES, JR., OF HANOVER, NEW HAMPSHIRE.

APPARATUS FOR PHOTOGRAPHY OF COMPOSITE IMAGES.

Application filed July 11, 1921. Serial No. 483,650.

This invention relates to apparatus for the photography of composite images of stereoscopic effect, the components of the images respectively being images of the same object field from different points of view laterally separated, and therefore adopted to provide, in the composite, registry or coalescence only upon a center of interest in the object field.

The present invention further relates to means for practising photography according to the method set out in my application, Serial No. 452,273, filed March 14, 1921. One form of apparatus adapted for this purpose and comprising means for forming two such superposed images by a single lens and means for viewing the object field from the axis of the lens and from a point displaced to one side of the axis is disclosed in my application jointly with Charles A. Proctor, filed June 2, 1921, Serial No. 474,560.

The present invention utilizes the device of the said Ames and Proctor application, and further provides means for simultaneous formation of composite images by a plurality of lenses on separate films or other sensitive surfaces, and also provides means for so treating the images as to cause the respective films to bear complemental series of color-value images, each comprising a series of composites of images from two points of view corresponding to binocular vision. The negatives produced by the present apparatus are available to print positives adapted to be exactly superposed, which when colored in the respective complementary colors will form natural-color transparencies, or may be used for two-color projection in the appropriately colored light, pair by pair, of the superposed and similar complemental composites. These composites are exact counterparts in time and in contents, differing from each other only by correspondence to image-forming light transmitted through screens respectively of different and complemental colors. When used for monochromes by the omission of color screens, the apparatus produces simultaneously two identical negatives.

One object of the present invention is to minimize loss of light by providing for photographic use of all the available light incident upon the reflectors and lenses of the system. Other objects of the invention are to provide for proper synchronous adjustment of the lenses, proper synchronous positioning of the films and exposure, and so to arrange apparatus for these purposes as to make it convenient for motion-picture photography.

In the accompanying drawings,

Figure 1 shows a plan view partly in horizontal section of a camera embodying the invention;

Figure 2 is a detail side elevation of the reflector mounting and adjusting means partly in section on the line 2—2 of Fig. 1.

The preferred apparatus includes a primary mirror or reflector $m$ which may be a flat piece of glass silvered on its surface, and provides means 1 and 2 respectively for adjusting this reflector in respect to its mounting in altitude and in azimuth and means presently referred to for moving the mirror in azimuth. This primary reflector $m$ is supported on a mounting bracket 3 attached to or forming a part of the camera proper C. At a convenient place in the camera box, for instance in one corner as shown, 45° prisms 5 and 6 are mounted with their hypotenuse faces cemented in contact at a surface $d$, which is a partly reflecting and partly transmitting surface such as a half-silvered or a half-platinized coating on one or both of the plane faces brought into coalescence at $d$. Suitable apertures 7 are provided in the box C to admit the reflected beam from the primary reflector $m$ incident in the direction of the arrows $a$, $a'$ and the direct beam from the object field incident in the direction of $b$.

The central ray of the beam $a$, $a'$ is reflected at the under surface (as seen in the figure) of the light dividing surface $d$ axially in respect to a lens $L^1$ which preferably is the kind of lens described and claimed in my application for patent, Serial No. 475,561, filed June 2, 1921, which lens gives a characteristic image having better definition in the region of its axis than elsewhere, and having the aberrations characteristic of the normal human eye. The lens $L^1$ is mounted in a tubular mounting 9 secured by the right-hand screw thread to a circular seat 10, mounted in a fixed relation to or forming a part of the mounting 11 for the prisms 5 and 6.

Not all of the beam of light $a'$ is reflected by the surface $d$; substantially half of the light incident on the surface $d$ is transmitted thereby in the axial direction of a lens $L^2$ similar to the lens $L^1$ and similarly mounted, except that the screw thread between the lens tube and its mounting, as shown at 12, is a left-hand thread. The lens tubes 9 are provided with gear teeth 13 into which racks 14, 14, respectively take. These racks are formed on or attached to a carriage 15 centrally bored and threaded for a screw 16 held to rotate in a vertical position in bearings 17 and having a reduced portion 18 extending outside of the camera box C, where it is provided with a hand wheel 19 for the purpose of turning the screw to simultaneously adjust the axial position of the respective lenses $L^1$ and $L^2$, by means of racks 14, gears 13, and the screw-threaded mounting.

For color photography the camera may comprise a red absorption screen S' and green absorption screen $S^2$ suitably mounted between the respective lenses $L^1$ and $L^2$ and their image planes.

The beam of light $b$ from the object field is reflected from the upper side of light dividing surface $d$, and enters the lens $L^2$ axially, thus passing through the screen $S^2$; that portion of the beam $b$ transmitted by the surface $d$ enters the lens $L^1$ axially and thence passes through the screen S'. The central ray of the beam $b$ in respect to the respective images from the lens $L^1$ and lens $L^2$ is thus coincident with the central ray of the beam of light $a'$. According to different adjustments of the primary reflector $m$, the central rays proceed from an object at the intersection of the directions $a$ and $b$, which object is the center of interest in the object field.

The images are thus respective composites centrally viewed from the intersection of the axes of the lenses with the surface $d$, and the intersection of the axis of lens $L^2$ with primary reflector $m$.

The components of this simultaneous pair of composite images are respectively brought to a focus on films $f^1$, $f^2$, suitably driven intermittently in unison, for example by toothed driving rolls 25, 26, fast on shafts 27 and 28 respectively, which are geared together for simultaneous motion by bevel gears 29. One of these shafts also has fast thereon the driven member 30 of a train of gearing driven intermittently by any of the familiar means for driving motion picture film feeding apparatus intermittently.

The films are exposed during their periods of quiescence by suitable shutters preferably arranged as shown at 31 and 32, respectively, to rotate on stud shafts 33, 34, respectively, suitably mounted in respect to the box C and arranged to be driven in unison, for which convenient means such as bevel gear 36 taking respectively into the bevel pinions 37' and 38' associated with the shutters 31 and 32 respectively may be employed. The gear 36 may be driven by shaft 37 in suitable bearings in the box C, the shaft 37 in turn being driven by bevel gearing 39 having members respectively fast on a shaft 37 and on a sleeve free on the shaft 28, and having an attached gear 40 adapted to be continuously driven by known means in unison with the integrated intermittent motion of the intermittent drive for gear 30.

It will be observed that the light dividing surface $d$ is so related to the other elements that beams of light from any point in the object-field are incident upon its opposite faces symmetrically and at equal angles, and that the part of the light of one beam transmitted by the light dividing surface is coincident in direction with the part of the light of the other beam reflected by said surface. This is true for any radiant from such a point throughout the light emitted from the emergent surfaces of both prisms 5 and 6, so that the image forming light focussed by the like lenses $L^1$ and $L^2$, whether arriving at the lenses axially or at divergent angles, is gathered to focus by the refractive elements of each lens under identical circumstances for each beam of light, and under identical circumstances for each pair of the composite images as compared with each other. This advantage flows in part from the arrangement of identical lenses with their axes intersecting in the light-dividing plane and at equal angles thereto. In the instance shown, the sum of these angles is 90°, but that is not essential so long as the light dividing surface is a bisector of the axial angle, and the entrance and emergence faces of the prisms 5 and 6 are respectively at complemental angles to the axial angle.

In use, the axis of lens $L^1$ is aimed at the center of interest, and mirror $m$ is adjusted in respect to the distance of the center of interest in the line of sight, so that the images are coalescent at a point in the center of interest.

For focal definition of the images of objects at different distances along the axes of lenses $L^1$, $L^2$ a different position of the lens tube 9 is required for each different distance of the object up to a critical distance, beyond which light from the object is virtually parallel light, the angle of divergence then being within the errors of the lens. When the center of interest is at distances exceeding this magnitude, the corresponding best position of mirror $m$ is parallel with the surface $d$, the component images of all objects beyond the critical distance being in coalescent relation with each other under these conditions. When the center of interest is at a nearer object, change of the position of the lens tube and lens to focus this object on the film is required, and a change is also required in the azimuth position of mirror $m$ to cause the reflected and real axial directions to converge upon the nearer object then in focus, so that the component images of this object may coincide. The change in the azimuth angle of the mirror required to secure convergence of the direct and reflected axial directions on such nearer object is proportional to the axial motion of the lens required to focus the object on the film.

These relations may, if desired, be taken advantage of by mechanically causing the mirror $m$ to be adjusted in azimuth for axial convergence as a consequence of change in focal position of the lenses so that focussing on the object at the center of interest automatically causes the images to be in coalescence in respect to that object.

In the specific instance shown, the camera box is provided with a bearing offset $C'$ bored for a short shaft 51 carrying an arm 52 adapted to be held in contact with a surface of the lens tube 9 of one of the lenses by a spring 58 surrounding shaft 51. Outside of the offset $C'$ shaft 51 has fixed upon it an arm 53 radially slotted at 54 and extending toward the axis of azimuth motion 4 of mirror $m$. In slot 54 plays a radially adjustable pin 55 held in a radial slot in, and adapted to be set in adjustment by thumb-nut 56 in respect to, an arm 57 fastened to the axis 4, which bears in the bracket 3.

Motion outward of tube 9 to focus on a nearer object moves the mirror $m$ to cause nearer convergence of directions $a$ and $b$, the extent of angular motion of the mirror depending on the ratio of the distances 4, 55, to the distance 55, 51, and being adjustable by moving pin 55. This ratio is adjusted to agree with observed positions of the particular lens and proper position of the mirror for nearby and distant objects. Since the focal distance through which the lens must be moved to focus on objects the same distance apart in the line of sight increases rapidly as the object approaches the camera, and since the angular motion of the mirror for convergence on points equidistant in the line of sight is greater for nearby than for far-off objects, the greater motion of the lens corresponds to the greater motion of the mirror, and automatic adjustment through the narrow angle involved is effected with an approximation to accuracy close enough for all practical purposes.

The apparatus may be usefully employed without the mirror $m$ or its mounting, for example for the superposition of photographs of objects in or near the axis of lens $L^1$ upon a field in or near the axis of lens $L^2$. An action taking place against a dark background in one of these directions, for instance, may be superposed upon scenery occupying the other field.

By stopping one of the apertures 7, the apparatus may be instantly converted from center-of-interest photography to the making of monocular images by each lens; or when the lenses $L^1$, $L^2$ are of the corrected type, which may sometimes be employed for this use, of making detailed images covering the whole field. When such corrected lenses are used, composite photography for stereoscopic effect, the reflector $m$ being in use, may still be made, the diffusions and aberrations of the field away from the center-of-interest then consisting of overlapping and non-registering detail, the effect of which approximates the confusion caused by ocular aberrations at angles away from the axis in binocular vision, and is sufficiently deceptive to cause the observer to give his attention to the well-defined center of interest.

It will be observed that the utility of the apparatus is not entirely dependent upon its arrangement for the purpose of obtaining separation of the points of view to which the images of each component respectively of the composite are related. For making simultaneous color value negative films at $f^1$ and $f^2$, as indicated above for example, the device is advantageous in securing at each film a duplicate of the images on the other film. The arrangement in which the image on each film is comprised of components of light entering the optical system in different directions is of further advantage in averaging undesirable aberrations. It will therefore be understood that the mirror $m$ may be brought as close as is convenient to the light dividing surface $d$ without sacrifice of any advantage except that of the illusion of stereoscopic vision which, under these circumstances, is reduced, depending upon the degree of approach of the mirror $m$ to the surface $d$.

What I claim is:

1. Apparatus for photography having therein two like lenses and means including a reflector and light-dividing means for severally forming thereby a similar plurality of composite images, the component images of the composite formed by each lens comprising respectively the counterpart of a component image of the composite image formed by the other lens.

2. Apparatus for photography having therein two like lenses and means including a reflector and light-dividing means for severally forming thereby a similar plurality of composite images, the component images of the composite formed by each lens comprising respectively the counterpart of a component image of the composite image formed by the other lens, the component images of each composite being respectively images of the same object field from laterally separated points of view.

3. Apparatus for photography of composite images having stereoscopic effect comprising like lenses, means for exposing sensitive surfaces to the respective images of said lenses, light-dividing means adapted simultaneously to transmit and to reflect respectively to each of said lenses portions of each of a plurality of beams of light and means for causing beams of light radiant from a point in the object-field severally to be incident upon said light-dividing means.

4. Apparatus for photography of composite images having stereoscopic effect comprising like lenses, means for exposing sensitive surfaces to the respective images of said lenses, light-dividing means adapted simultaneously to transmit and to reflect respectively to each of said lenses portions of each of a plurality of beams of light incident thereon in different directions, and means for causing beams of light radiant from a point in the object-field severally to laterally separated points to be incident severally upon said dividing means in said different directions.

5. Apparatus for photography of composite images from different points of view comprising light-dividing means adapted partly to reflect and partly to transmit light incident thereon, means for causing light from an object in the object field to be incident upon said means in different directions, whereby light transmitted in one direction and light reflected from another direction emerges from the dividing means in the same direction, in combination with lenses mounted respectively to form images in the composite or resultant beams of light emerging from the light dividing means in different directions.

6. Apparatus for simultaneous photography of a plurality of like images of the same object-field comprising lenses for the respective images whose axes converge upon a light-dividing surface adapted partly to transmit and partly to reflect severally portions of the light incident upon the said surface in and near the axial directions respectively of said lenses, in combination with means for causing light emitted from an object to separated points to enter the apparatus in different directions lying in and near the said axial directions.

7. Apparatus for photography having therein two like lenses and means including a reflector and light-dividing means for severally forming thereby a similar plurality of composite images, the component images of the composite formed by each lens consisting respectively of the counterpart of a component image of the composite image formed by the other lens, and color screens of complementary color interposed between the several lenses and their image planes.

8. Apparatus for photography having therein two like lenses and means including a reflector and light-dividing means for severally forming thereby a similar plurality of composite images, the component images of the composite formed by each lens consisting respectively of the counterpart of a component image of the composite image formed by the other lens, the component images of each composite being respectively images of the same object field from laterally separated points of view, and means for adjusting the reflector to bring into coalescence in said composites the component images of an object at any distance in the object field.

9. A camera for making simultaneous composite images from two different points of view of the same object having therein two photographic lenses arranged with their axes at an angle to each other, a light-dividing device comprising a partly reflecting and partly transmitting surface mounted on a bisector of said angle and intersected by said axes, means for supporting light sensitive surfaces in the image planes of the respective lenses, and means for causing beams of light severally divergent from an object to said light dividing surface, and to a point separated laterally therefrom, to be severally incident on different sides of said surface at equal angles thereto.

10. A camera for making simultaneous composite images from two different points of view of the same object having therein two photographic lenses arranged with their axes at an angle to each other, a light dividing device comprising a partly reflecting and partly transmitting surface mounted on a bisector of said angle and intersected by said axes, means for supporting light sensitive surfaces in the image planes of the respective lenses, and means for causing beams of light severally divergent from an object to said light dividing surface, and to a point separated laterally therefrom, to be severally incident on different sides of said surface at equal angles thereto, the means for causing one of said beams to be incident in said direction comprising a reflector separated from the light dividing surface and normal to the plane defined by the axes of the lenses.

11. In a camera, lenses arranged with their axes at an angle to each other, means for exposing a sensitive surface across a prolongation of the axis of each lens at a predetermined distance from the nodal point of the respective lens, and means for simultaneously moving the lenses axially through the same distance, to effect focal adjustment equivalently for each lens.

12. In a camera, lenses arranged with their axes at an angle to each other, means for exposing a sensitive surface across a prolongation of the axis of each lens at a predetermined distance from the nodal point of the respective lens, mountings for the lens including means for moving them axially upon rotation on their axes, and means for rotating the respective mountings through the same angles of rotation.

13. In a camera, the combination with a lens and a mounting therefor movable with the lens in the direction of its axis, of light dividing means adapted to transmit light for one component image formed by the lens, a movably mounted mirror adapted to reflect light to the light dividing means for another component image, said mirror being rotatable about an axis at one side of the light dividing means, and means movable with the lens mount adapted upon axial motion of the lens to move the mirror about its axis accordingly, whereby beams of light transmitted to the lens and reflected from the mirror respectively converge upon the object when the image of the object is in focus.

14. In a camera, the combination with a lens and a mounting therefor movable with the lens in the direction of its axis, of light dividing means adapted to transmit light for one component of an image formed by the lens, a movably mounted mirror adapted to reflect light to the light dividing means for another component of said image, said mirror being rotatable about an axis at one side of the light dividing means, pivoted means engaging the lens mount, and an arm on the axis of the mirror contacting with said pivoted means, whereby motion of the lens toward the object field swings the mirror accordingly about its axis.

Signed by me at Boston, Massachusetts, this 27th day of June, 1921.

ADELBERT AMES, Jr.